April 6, 1965              A. J. SOCHA             3,176,574
LOW REFLECTANCE COATINGS FOR OPTICAL ELEMENTS INCLUDING
GRADUATED HIGH INDEX LAYER
Filed Dec. 19, 1960                           2 Sheets-Sheet 2
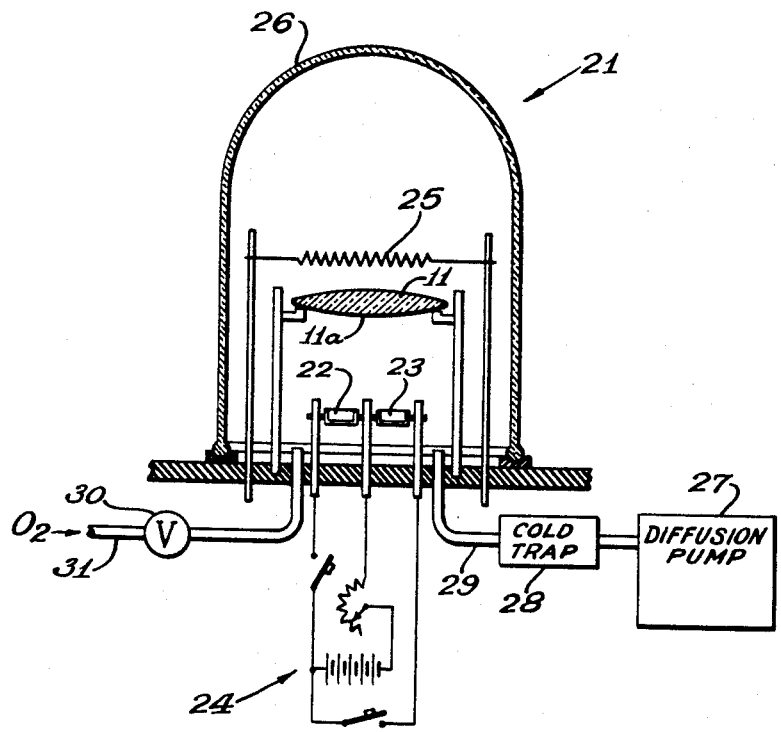
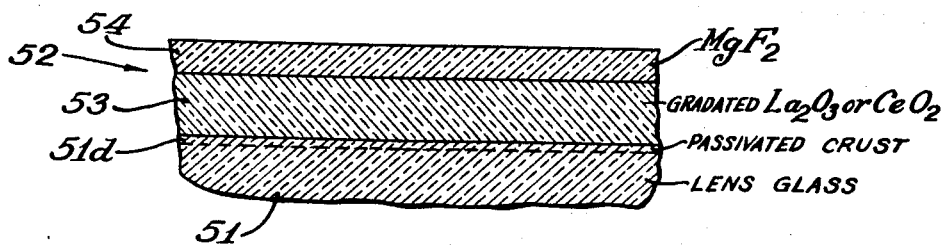
Inventor:
Arthur J. Socha
By Robert F. Miehle
Atty.

United States Patent Office 3,176,574
Patented Apr. 6, 1965

3,176,574
LOW REFLECTANCE COATINGS FOR OPTICAL ELEMENTS INCLUDING GRADUATED HIGH INDEX LAYER
Arthur J. Socha, Wadsworth, Ill., assignor to Bell & Howell Company, Chicago, Ill., a corporation of Illinois
Filed Dec. 19, 1960, Ser. No. 76,708
3 Claims. (Cl. 88—1)

This invention relates to low reflectance optical elements and methods of making the same, and more particularly to low reflectance coatings for lenses and methods of applying such coatings.

The application of quarter wavelength layers of magnesium fluoride to glass for the purpose of lowering surface reflectivity is well known. Such films obtain a minimum reflectivity at only one point of the spectral range which is usually chosen in the center of the visible spectrum. Even at this point the reflectivity is not zero except for one very high index glass. The reflectivity at the extremes of the spectral range, namely in the blue and the red end of the spectrum, is much higher and in fact may be higher than the uncoated reflectivity of the glass. One consequence of this characteristic of single quarter wave magnesium fluoride layers is that their average reflectivity is not as low as their minimum reflectivity. However, although considerable gains in light transmission are achieved by the use of lower reflectance magnesium fluoride coatings, a very serious objection remains. The high blue and red reflectivity of these films causes a considerable residual color to appear in both the reflected and transmitted light. This color is normally purple on reflection and yellowish by transmitted light.

For simple lenses of only four or six surfaces, the coloring due to the low reflectance film is seldom a serious disadvantage. However, for more complex lenses, particularly lenses of the zoom type commonly employed in motion picture cameras, and having upwards of twenty glass-air surfaces, the accumulation of color seriously affects the color balance of color pictures taken with such lenses, not to mention the considerable loss of lens speed resulting therefrom. In projection lenses the yellowish cast of the transmitted light has been found to be objectionable because a screen illuminated with yellowish light appears to the observer to have a lower illumination than a screen illuminated with blueish light even when the yellow light has a higher measured brightness than the blue light. These problems have been solved by the two layer coatings disclosed and claimed in co-pending application Serial No. 11,252, filed February 26, 1960, by Gerhard Lessman and assigned to the common assignee, and now abandoned, wherein there is an inner half-wave length layer of a high index material such as for example lanthanum oxide or cerium oxide and an outer quarter-wave length layer of lower index material such as for example magnesium fluoride. Such a two layer coating reduces the reflectivity over previously known single layer low reflectance coatings very greatly. However, it would be desirable to have a plural layer coating which provides even lower reflectivity than the above two layer coatings.

Accordingly, one of the objects of my invention is to provide novel plural layer low reflectance coatings having gradated layers and methods of making the same.

Another object of the invention is to provide a two layer low reflectance coating in which the index of refraction of one of the layers is gradated from low at the inner surface thereof to high at the outer surface thereof, and methods of making the coating.

A complete understanding of the invention may be obtained from the following detailed description of low reflectance optical elements forming specific embodiments thereof, when read in conjunction with the appended drawings; in which:

FIG. 3 is a schematic, sectional view of a vapor plating apparatus for forming low reflectance layers on glass in accordance with a method forming one embodiment of the invention; and FIG. 4 is a fragmentary sectional view of glass having a three layer low reflectance coating according to the invention.

The invention provides plural layer low reflectance coatings each including an outer layer of about one-quarter wavelength low index low reflection material such as, for example, magnesium fluoride with an inner layer of a combined thickness of about one-half wavelength and comprising a high index material such as, for example, lanthanum oxide, the index of refraction of the inner layer varying upwardly proceeding outwardly from the glass. In one embodiment of the invention, the glass to which the innermost layer is applied is substantially uniform in its index of refraction throughout its thickness. In another embodiment of the invention, the surface of the glass adjacent the innermost low reflectance layer has a thin leached or passivated crust portion of lower index than the remainder of the glass. In a method forming one embodiment of the invention, a trace of oxygen is added to the vacuum in which the inner layer is vapor plated on the glass surface so that the initially applied portion of the inner layer has a lower index of refraction. Also the temperature of the glass may be varied during the application of the inner layer to facilitate the gradation from low to high, and the inner layer preferably is applied more rapidly than conventionally occurs and at a higher temperature of the plating material.

Figure 1:
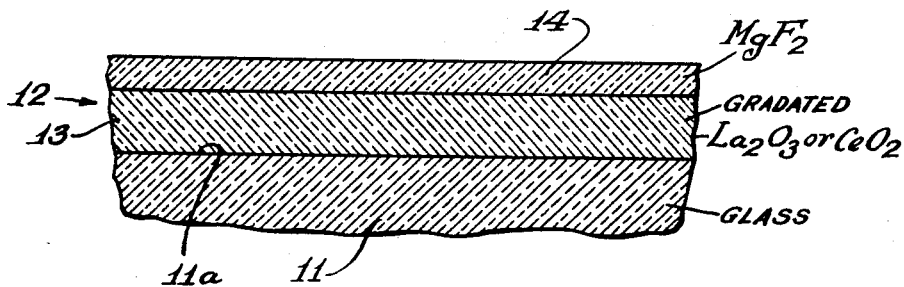
FIG. 1 is a fragmentary sectional view of glass coated with a two layer low reflectance coating according to the invention.

In FIG. 1 there is shown a coated lens forming one embodiment of the invention. The lens includes a lens or substrate 11 of optical glass having an index of refraction for the sodium $d$ line at least as great as 1.48 having a two layer low reflectance coating 12 on the surface 11$a$ thereof. The coating 12 comprises an inner layer 13 of a high index of refraction substantially higher than that of the glass 11, lanthanum oxide ($La_2O_3$) being one excellent material for the inner layer 13. On the layer 13 is an outer layer 14 of material having an index of refraction substantially lower than that of the layer 13, magnesium fluoride ($MgF_2$) being excellent for the layer 14.

Figure 2:
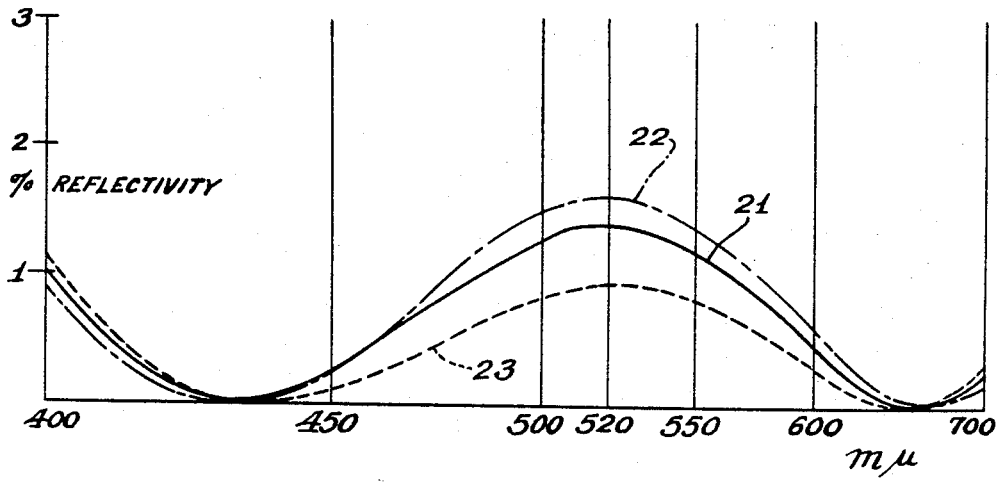
FIG. 2 is a graph showing the spectral reflectivities of glass coated with two layer coatings with different gradation of the index of refraction of the inner layer of the two layer coating.

It has been found that in a two layer low reflectance coating such as that disclosed in the above-mentioned Lessman co-pending application that the inner layer often is gradated from one index of refraction at its innermost surface to a different index of refraction at its outermost surface. The innermost layer may also sometimes be uniform in index of refraction throughout its thickness, or, due to variations in coating conditions, may sometimes vary from low to high in its index of refraction proceeding outwardly from the surface of the glass or from high to low in such index proceeding outwardly from the surface of the glass. In FIG. 2, a curve 21 illustrates the reflectivity over the visible spectrum for a coating on glass in which there is an outer quarter wavelength layer of magnesium fluoride and an inner half wavelength layer of lanthanum oxide uniform in index of refraction throughout its thickness. Curve 22 illustrates the reflectivity for a coating identical with that just described but in which the index of refraction of the inner layer is gradated unfavorably, that is the innermost layer varies from high to low proceeding outwardly from the glass, the reflectivity being substantially higher in the unfavorably gradated example. Curve 23 shows the reflectivity of a lens coated identically with those having the curves 21 and 22 but having the innermost layer of lanthanum oxide gradated favorably which is from low to high in index of refraction proceeding outwardly from the glass, the lens having the favorably gradated layer having much less reflectivity than either of the other two structures.

The thicknesses of the layers 13 and 14 and throughout this application are given in terms of wavelengths and are optical thicknesses as distinguished from physical thicknesses, and in one constructed embodiment of the invention, the reference wavelength was approximately in the center of the visible spectrum, being 520 milli-microns, the layer 13 being about 260 milli-microns in thickness and the layer 14 being about 130 milli-microns in thickness. However, for some applications, the reference wavelength may be away from the center portion of the visible spectrum and even near to or into the infrared or ultraviolet portions of the spectrum. The thicknesses may be controlled as desired during coating by suitable known spectrophotometer means.

In constructing the coated lens of FIG. 1 in accordance with a method forming one embodiment of the invention, the surface 11a to be coated of the lens 11 was first thoroughly cleaned with organic solvents such as methanol or trichloroethylene, followed by washing in an aqueous solution of a detergent such as that sold under the trade name "Duponal." The glass pieces were thoroughly cleaned and dried and were then placed in a vacuum evaporation apparatus 21. The pieces of glass then were further cleaned by the application of an ion or glow discharge as is known in the art. Then boats 22 and 23 containing respectively lanthanum oxide and magnesium fluoride were degassed by heating them by means of known heating circuit 24 with baffles over the open tops of the boats and with known heater 25 for heating the glass off. Then, the heat to the boats is turned off and bell jar 26 is pumped down while the heater 25 is turned on to heat the glass 11. The baffles are removed from the boats. The bell jar is evacuated by means of a known diffusion pump 27 with a refrigerated, tortuous cold trap 28 in conduit 29 from the bell jar to the pump to keep the gases of the diffusion pump isolated from the bell jar. Then when the pressure in the bell jar is down to about $1 \times 10^{-4}$ microns of mercury, a valve 30 in a supply line 31 of oxygen is opened manually and reclosed to supply a trace of oxygen to the interior of the bell jar which raises the pressure to about $3 \times 10^{-4}$ microns of mercury. Then the boat is heated to heat the lanthanum oxide and vaporize it at the unconventionally high temperature of above 2400° C. for about thirty seconds, and the heat is turned off. The effect of this process is to cause the initial portion of the lanthanum oxide plated on the glass surface 11a to be rich in oxygen and have an index of refraction for the sodium D line of about 1.85 and to increase gradually to about 1.95 at the outer surface of the layer 13. Another aid in making the layer 13 gradated from low to high is to turn off the heater 25 somewhat before the lanthanum oxide is started to be plated so that the substrate is substantially cooler than 320° C. during the coating of the glass with the lanthanum oxide.

After the lanthanum oxide layer 13 of one half wavelength in thickness is formed, the heater 25 is turned on again to heat the substrate to above 320° C. and the magnesium fluoride is heated to form the quarter wavelength layer 14 in a manner well known in the art. The thicknesses of the layers 13 and 14 are measured continuously by the above-mentioned spectrophotometer means during the plating operations and are precise. The resulting coated lens then had the reflectivity curve 23 (FIG. 2), the layer 13 having had a favorable gradation as readily evidenced by the spectrophotometer during the application thereof to the lens surface.

In FIG. 4 there is shown a coated lens forming another embodiment of the invention and including a lens blank 51 of high index of flint glass having an index of refraction for the sodium D line of at least as great as 1.60 and not substantially greater than 1.75. A leached out or passivated crust 51d of substantially pure silicon dioxide is formed on the optical surface of the lens blank to a thickness of not materially less than one thirty-second of a wavelength and not materially greater than one sixteenth of a wavelength and having an index of refraction for the sodium D line of less than 1.50. The crust 51d is formed by immersing the lens blank in a dilute solution of an acid for a selected period of time as disclosed and claimed in my co-pending application Serial No. 76,755 for "Methods of Treating Lens Surfaces" filed on an even date herewith and assigned to the common assignee. After the crust 51d has been formed, a layer 53 of approximately .525 of the reference wavelength in thickness and a layer 54 of approximately one-quarter wavelength in thickness are applied to the outer surface of the crust 51d to form a low reflectivity coating 52 in the manner described above in applying the layers 13 and 14 (FIG. 1). The layers 53 and 54 are identical with the layers 13 and 14 respectively, and the layer 53 may be of a material such as, for example, lanthanum oxide and the layer 54 of magnesium fluoride. The reflectivity curve for the coated lens of FIG. 4 approximates the curve 23 (FIG. 2).

While the invention is thus described, it is not wished to be limited to the precise details described, as changes may be readily made without departing from the spirit of the invention.

What is claimed is:

1. A low reflectance optical member, which comprises a substrate having a predetermined index of refraction substantially less than that of lanthanum oxide and greater than that of magnesium fluoride, a first layer on the substrate comprising lanthanum oxide gradated from low to high in index of refraction proceeding outwardly from the innermost portion of the inner layer and having a thickness of approximately one-half of a wavelength, and a second layer of magnesium fluoride of a thickness of approximately one-quarter of a wavelength on the first layer.

2. A two layer interference coating for a substrate having a predetermined index of refraction substantially less than that of lanthanum oxide and substantially greater than that of magnesium fluoride, which comprises a first layer on the substrate composed essentially of lanthanum oxide and gradated in index of refraction for the sodium $d$ line from about 1.85 at the innermost portion thereof to about 1.95 at the outermost portion thereof, the thickness of the first layer being approximately one-half of a wavelength, and a second layer comprised essentially of magnesium fluoride of a thickness of approximately one-quarter of a wavelength on the first layer.

3. A low reflectance optical member, which comprises a substrate of flint glass of an index of refraction for the sodium $d$ line not substantially less than 1.60 and not substantially greater than 1.75 and having a surface crust of silicon dioxide of a thickness between one-sixteenth and one thirty-second of a wavelength, an inner layer on the crust of about one-half wavelength in thickness, the innermost portion of the inner layer having an index of refraction substantially greater than that of the flint glass, said inner layer consisting essentially of lanthanum oxide gradated in index of refraction for the sodium $d$ line from about 1.85 at the inner surface thereof to a substantially higher index of refraction at the outer surface thereof, and a second layer on the inner layer having a thickness of about one-quarter of a wavelength and an index of refraction substantially less than that of the flint glass.

References Cited by the Examiner
UNITED STATES PATENTS

| | | | |
|---|---|---|---|
| 2,281,474 | 4/42 | Cartwright et al. | 88—1 |
| 2,331,716 | 10/43 | Nadeau et al. | 88—1 X |
| 2,366,516 | 1/45 | Geffcken | 88—1 X |
| 2,369,741 | 2/45 | Jones et al. | 88—1 X |
| 2,478,385 | 8/49 | Gaiser | 88—1 |
| 2,539,149 | 1/51 | Miller | 88—1 X |
| 2,641,954 | 6/53 | Scharf et al. | 88—1 |
| 2,808,351 | 10/57 | Colbert et al. | 88—106 X |
| 2,834,689 | 5/58 | Jupnik | 88—106 X |

FOREIGN PATENTS 1,034,960    4/53    France.

DAVID H. RUBIN, *Primary Examiner.*
EMIL G. ANDERSON, *Examiner.*